United States Patent
Bernard, Jr.

[11] Patent Number: 5,390,045
[45] Date of Patent: Feb. 14, 1995

[54] ADJUSTABLE WINDOW TINTING SYSTEM

[76] Inventor: Leroy A. Bernard, Jr., 4090 W. Lynwood Dr., Beaumont, Tex. 77703

[21] Appl. No.: 87,577

[22] Filed: Jul. 9, 1993

[51] Int. Cl.$^6$ ............ B60J 3/04; G02F 1/15
[52] U.S. Cl. ............ 359/275; 359/272; 359/361; 359/601; 359/609; 359/265
[58] Field of Search ............ 359/272, 275, 267, 361, 359/601, 600, 609, 260, 265

[56] References Cited

U.S. PATENT DOCUMENTS

| | | | |
|---|---|---|---|
| 4,532,917 | 8/1985 | Taff et al. | 126/430 |
| 4,696,547 | 9/1987 | Sims | 350/319 |
| 4,893,908 | 1/1990 | Wolf et al. | 350/357 |
| 5,071,206 | 12/1991 | Hood et al. | 359/360 |
| 5,099,621 | 3/1992 | Schacklette et al. | 52/171 |
| 5,167,217 | 12/1992 | Klier et al. | 126/561 |
| 5,231,531 | 7/1993 | Defendini et al. | 359/275 |
| 5,239,405 | 8/1993 | Varaprasad et al. | 359/272 |
| 5,239,406 | 8/1993 | Lynam | 359/275 |

FOREIGN PATENT DOCUMENTS 56-21915  2/1981  Japan .

*Primary Examiner*—Eugene R. LaRoche
*Assistant Examiner*—Viet Q. Nguyen
*Attorney, Agent, or Firm*—Hugh E. Smith

[57] ABSTRACT

A selectively variable window tinting system for limiting a passage of both visible light and radiative heat through an automobile window. Embodiments of the system include window glass assemblies which utilize photochromatic glass, electrochromatic glass, and a pair of spaced glass panes fillable with a tinted fluid. The latter embodiment also utilizes a plurality of differently tinted fluids which may be selectively injected between the glass panes to provide various amounts of tinting therein.

5 Claims, 4 Drawing Sheets

ADJUSTABLE WINDOW TINTING SYSTEM

FIELD OF THE INVENTION

The present invention relates to tinted windows and more particularly pertains to an adjustable window tinting system for limiting a passage of both visible light and radiative heat through an automobile window.

DESCRIPTION OF THE PRIOR ART

The use of tinted windows is known in the prior art. More specifically, tinted windows heretofore devised and utilized for the purpose of limiting a passage of both heat and light through window glass are known to consist basically of familiar, expected and obvious structural configurations, notwithstanding the myriad of designs encompassed by the crowded prior art which have been developed for the fulfillment of countless objectives and requirements.

For example, an adjustable tint window with an electrochromatic conductive polymer is illustrated in U.S. Pat. No. 5,042,923 which includes first and second window panes delimiting a cavity containing an ion-conducting electrolyte that contacts opposing surfaces of the first and second window panes. Applying a potential between the first and second window panes provides a selected amount of light transmittance upon a passage of current therebetween.

Another patent of interest U.S. Pat. No. 4,948,705 which discloses a photochromatic glass highlight mask. The highlight mask is especially suited for printing from positive color transparencies and is made of a photochromatic glass such as Corning "PHOTOGRAY EXTRA" sunglass lens material.

Other relevant patents include U.S. Pat. No. 4,854,957, U.S. Pat. No. 4,259,406, and U.S. Pat. No. 4,979,976.

While these devices fulfill their respective, particular objectives and requirements, they aforementioned patents do not describe a selectively variable window tinting system for limiting a passage of visible light and radiative heat through an automobile window. Therefore, the present invention attempts to overcome deficiencies present in conventional automobile glass by providing window glass which may be selectively tinted during the day time but which will remain clear for nighttime driving. In this respect, the adjustable window tinting system according to the present invention substantially departs from the conventional concepts and designs of the prior art, and in so doing provides an apparatus primarily developed for the purpose of selectively limiting a passage of both visible light and radiative heat through an automobile window.

SUMMARY OF THE INVENTION

In view of the foregoing disadvantages inherent in the known types of tinted windows now present in the prior art, the present invention provides a new adjustable window tinting system construction wherein the same can be utilized for selectively limiting a passage of visible light and radiative heat through an automobile window. As such, the general purpose of the present invention, which will be described subsequently in greater detail, is to provide a new adjustable window tinting system apparatus which has many of the advantages of the tinted windows mentioned heretofore and many novel features that result in a adjustable window tinting system which is not anticipated, rendered obvious, suggested, or even implied by any of the prior art tinted windows, either alone or in any combination thereof.

To attain this, the present invention essentially comprises a selectively variable window tinting system for limiting a passage of both visible light and radiative heat through an automobile window. Embodiments of the system include window glass assemblies which utilize photochromatic glass, electrochromatic glass, and a pair of spaced glass panes fillable with a tinted fluid. The latter embodiment also includes a plurality of differently tinted fluids which may be selectively injected between the glass panes to provide various amounts of tinting therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable window tinting system apparatus which has many of the advantages of the tinted windows mentioned heretofore and many novel features that result in a adjustable window tinting system which is not anticipated, rendered obvious, suggested, or even implied by any of the prior art tinted windows, either alone or in any combination thereof.

It is another object of the present invention to provide a new adjustable window tinting system which may be easily and efficiently manufactured and marketed.

It is a further object of the present invention to provide a new adjustable window tinting system which is of a durable and reliable construction.

An even further object of the present invention is to provide a new adjustable window tinting system which is susceptible of a low cost of manufacture with regard to both materials and labor, and which accordingly is then susceptible of low prices of sale to the consuming public, thereby making such adjustable window tinting systems economically available to the buying public.

Still yet another object of the present invention is to provide a new adjustable window tinting system which provides in the apparatuses and methods of the prior art some of the advantages thereof, while simultaneously overcoming some of the disadvantages normally associated therewith.

Still another object of the present invention is to provide a new selectively variable window tinting system which allows an operator of a vehicle to control an amount of tint present within the vehicle's windows.

Yet another object of the present invention is to provide a new adjustable window tinting system for selectively limiting a passage of both visible light and radiative heat through an automobile window.

Even still another object of the present invention is to provide a new automobile window tinting system which utilizes photochromatic glass that automatically darkens upon exposure to sunlight.

Even still yet another object of the present invention is to provide a new adjustable window tinting system which utilizes electrochromatic glass that may be selectively energized by a user to provide various amounts of tinting therein.

Yet even still another object of the present invention is to provide a new adjustable window tinting system that utilizes a pair of spaced glass panes fillable with a tinted fluid in which a plurality of differently tinted fluids may be selectively injected between the glass panes to provide various amounts of tinting therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
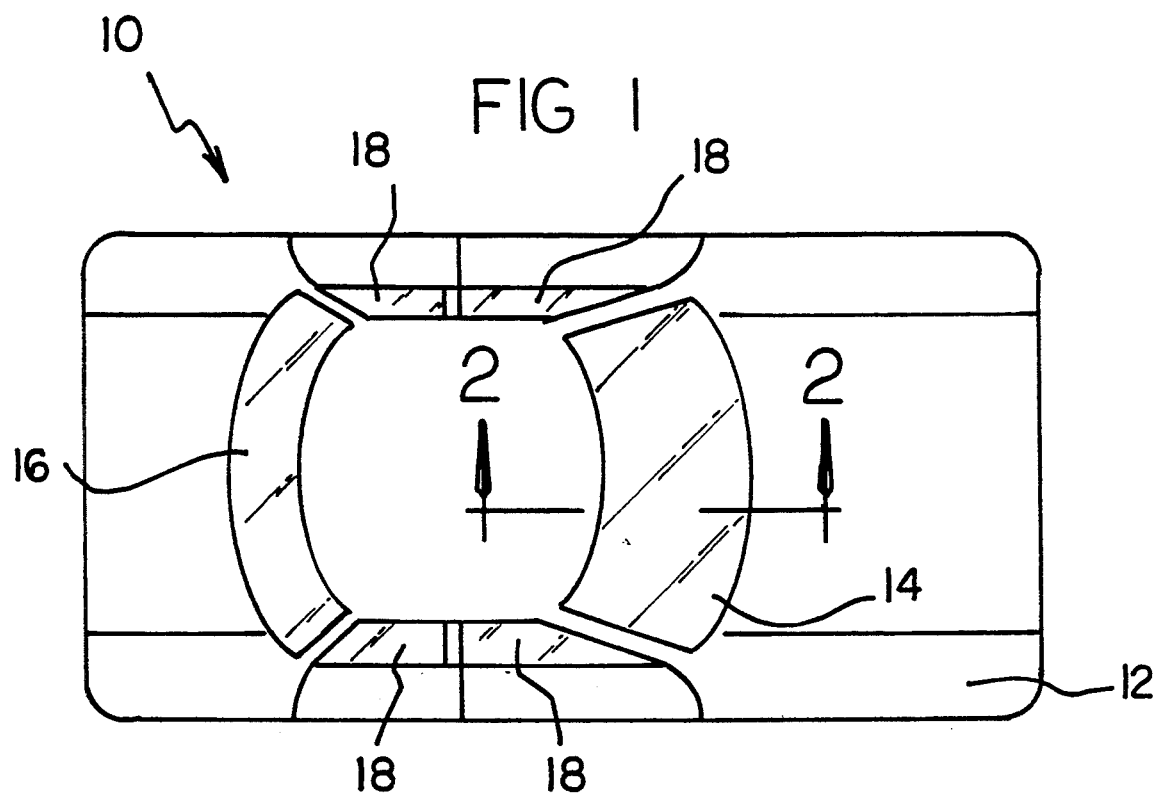
FIG. 1 is a top plan view of a vehicle showing a typical installation of an adjustable window tinting system comprising a first embodiment of the present invention.
Figure 2:
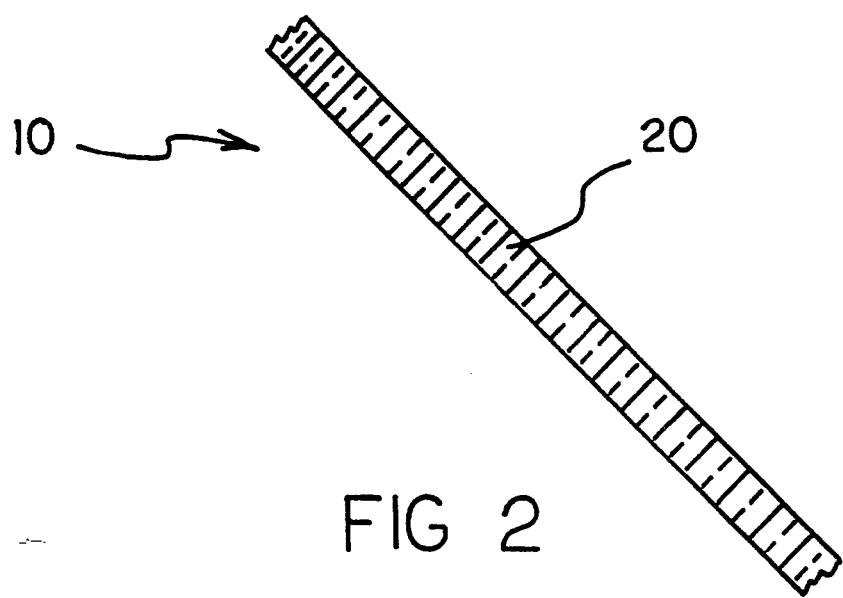
FIG. 2 is a cross sectional view taken along line 2—2 of FIG. 1 illustrating a portion of a windshield of the vehicle.

With reference now to the drawings, and in particular to FIGS. 1–2 thereof, a first embodiment of an adjustable window tinting system embodying the principles and concepts of the present invention and generally designated by the reference numeral 10 will be described.

A conventional vehicle 12 typically includes vehicle glass comprising a windshield 14, a rear glass 16, and a plurality of side glass 18 which allows a driver within the vehicle to see exteriorly of the vehicle. Embodiments of the present invention selectively tint the aforementioned portions of glass by utilizing photochromatic glass, electrochromatic glass, and a pair of spaced glass panes fillable with a tinted fluid. Although the present invention is described and illustrated in conjunction with an automobile, it should be realized that the instant invention may be utilized with glass of any type, such as house windows and the like, while still falling within the intent and purview of the invention.

More specifically, it will be noted that the first embodiment 10 comprises a windshield 14, a rear glass 16, and side glass 18 sized to fit within appropriate areas of a vehicle 12 and are comprised of a photochromatic glass 20 which substantially darkens upon exposure to sunlight. In the preferred embodiment, the glass formulated by Corning Glass Works, Corning N.Y., under U.S. Pat. No. 4,608,349 and commercially available under its trademark "PHOTOGRAY EXTRA" meets this criteria and is suitable for use therein. In use, the glass 14–18 of the vehicle 12 will remain clear for driving during nighttime conditions, and will become tinted upon exposure to sunlight, thereby providing a reduced passage of visible light and radiative heat therethrough.

Figure 3:
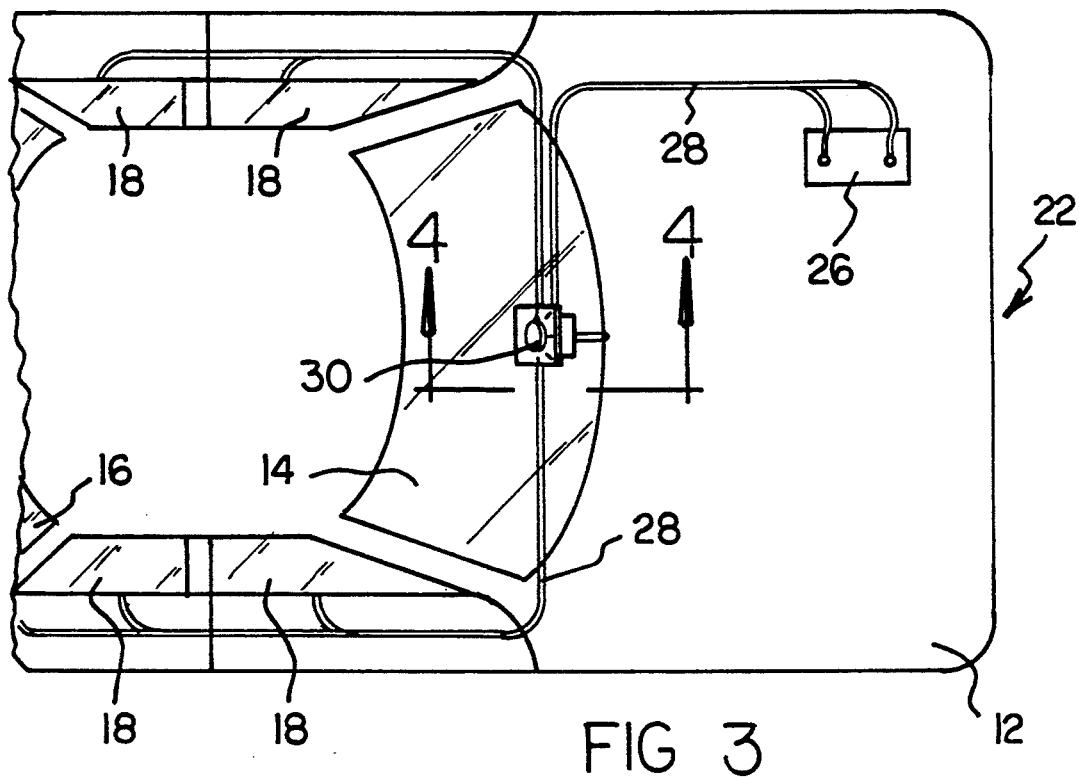
FIG. 3 is a top plan view of a vehicle having an adjustable window tinting system comprising a second embodiment of the present invention.
Figure 4:
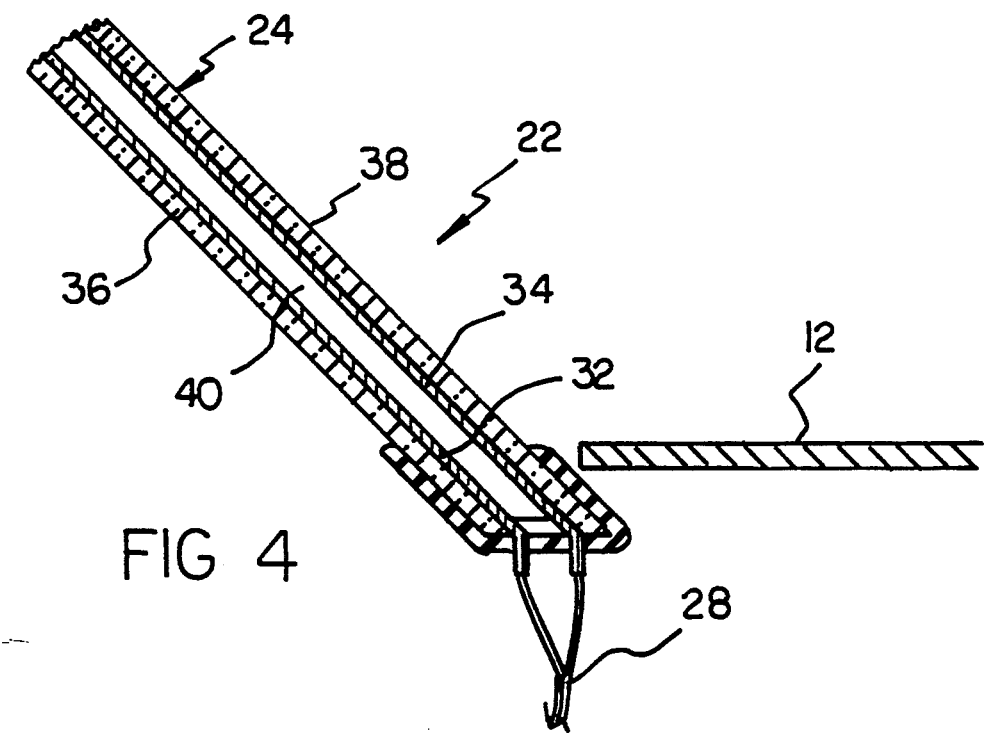
FIG. 4 is a cross sectional view taken along line 4—4 of FIG. 3 illustrating a portion of a windshield of the vehicle.
Figure 5:
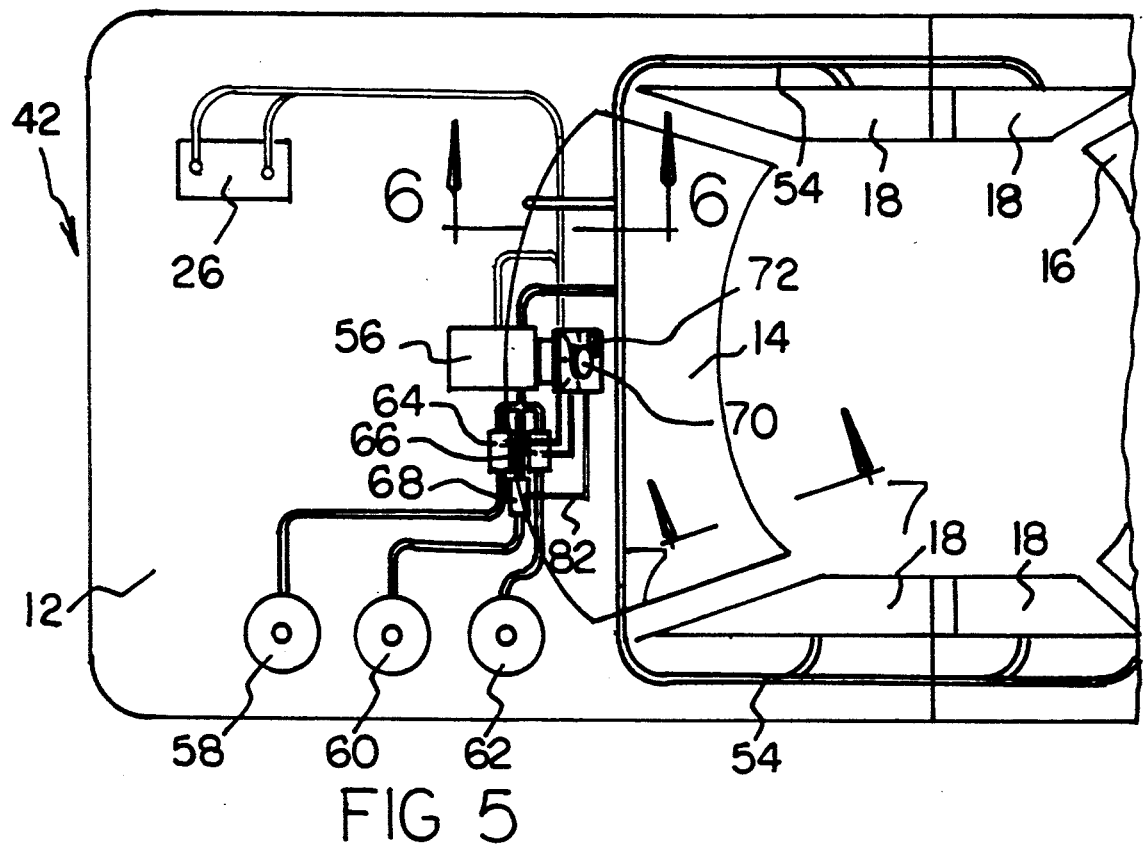
FIG. 5 is a top plan view of vehicle having an adjustable window tinting system comprising a third embodiment of the present invention.

A second embodiment of the present invention as generally designated by the reference numeral 22 is illustrated in FIGS. 3 and 4. The second embodiment 22 includes vehicle glass 14–18 comprised of an electrochromatic glass assembly 24 which may be selectively tinted upon energization, a cross section of such glass assembly being best illustrated in FIG. 4. The electrochromatic glass assembly 24 is electrically connected to a vehicle battery 26 through a plurality of wires 28. The wires 28 are electrically connected to a rheostat 30 which substantially regulates a flow of electrical power therethrough. The wires 28 are further connected to opposed conductors 32, 34 within the electrochromatic glass assembly 24 comprising each glass 14–18 of the vehicle 12.

The electrochromatic glass assembly 24 is comprised of a pair of glass panes 36, 38 arranged in a parallel relationship so as to define a distance therebetween, as best shown in FIG. 4. The conductors 32, 34 are disposed upon an unlabeled interior surface of the glass panes 36, 38 and are in conductive electrical communication with an electrochromatic conductive polymer 40 which resides therebetween. Preferably, the electrochromatic conductive polymer 40 is an oxidized conductive polymer, such as oxidized polyacetylene, polyperinaphthalene, or polynaphthalene. Polymers which are substantially transparent in their de-energized states are preferred. In use, the rheostat 30 allows electrical power from the battery 26 to be selectively supplied to the glass 14–18 of the vehicle 12 to substantially darken the electrochromatic conductive polymer 40 within the glass.

Figure 6:
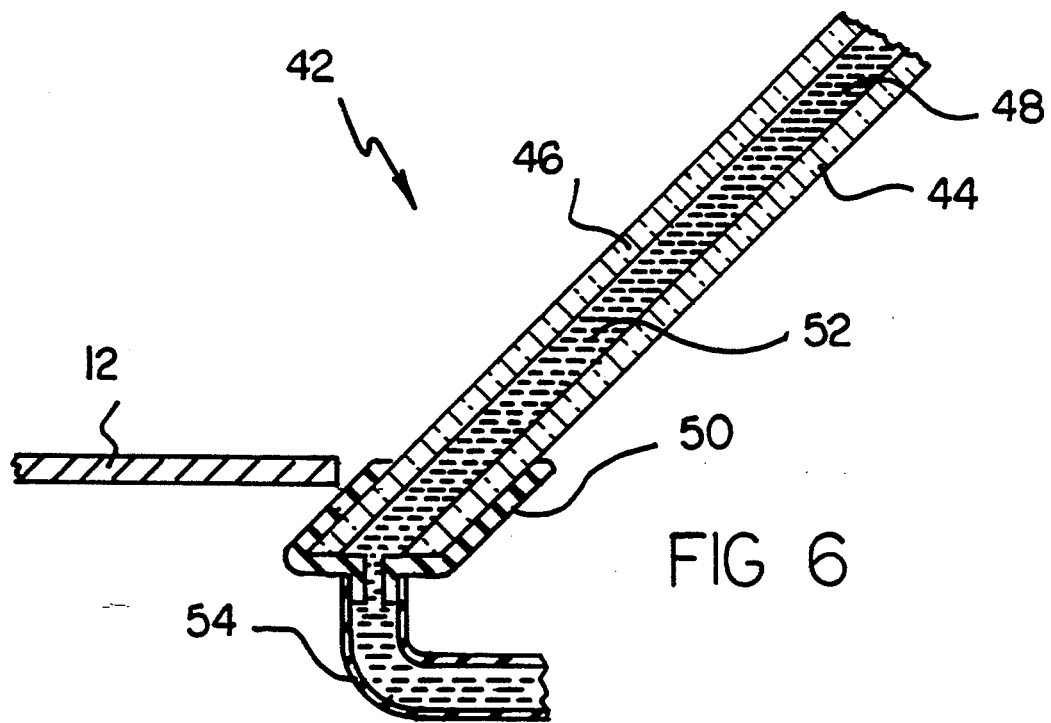
FIG. 6 is a cross sectional view taken along line 6—6 of FIG. 5 illustrating a portion of a windshield of the vehicle.

A third embodiment of the present invention as generally designated by the reference numeral 42 is illustrated in FIGS. 5–8. The third embodiment 42 includes vehicle glass 14–18 which is comprised of a pair of glass panes 44, 46 that are aligned in a parallel relationship in such a manner so as to define a space 48 therebetween, as best illustrated in FIG. 6. A seal 50 is secured to a bottom area of the vehicle glass 14–18 and includes an aperture which allows a tinted fluid 52, supplied through a plurality of fluid lines 54, to flow into the space 48 between the glass panes 44, 46. The tinted fluid 52, preferably comprising a substantially translucent liquid including an antifreeze, may be of any desired darkness to facilitate limiting a passage of visible light and radiative heat through the vehicle glass 14–16.

The tinted fluid 52 is selectively supplied to the vehicle glass 14–16 through a pump 56 powered by the vehicle battery 26. The pump 56 is operable to selectively move fluid from a first container 58, a second container 60, or a third container 62 through the fluid lines 54 and into the vehicle glass 14–18. A first valve 64, a second valve 66, and a third valve 68 are electrically connected to a selector 70 which is operable to selectively energize one of the valves, thereby allowing fluid from the first, second, or third container 58–62, respectively, to be moved by the pump 56 into the space 48 between the glass panes 44, 46 of the vehicle glass 14–18. The containers 58–62 may contain different colors of fluid, or fluids of differing darkness. A pump switch 72 is operable to energize the pump 56 in either a forward or a reverse manner to either fill or drain the vehicle glass 14–18, respectively.

In use, a user may selectively drain the tinted fluid 52 from the vehicle glass 14–18 by an operation of the pump switch 72 which causes the pump 56 to return the tinted fluid to one of the appropriate containers 58–62. Another one of the containers 58–62 may be placed in fluid communication with the pump 56 by a manipulation of the selector 70, thereby actuating an appropriate valve 64–68. The pump switch 72 may then be actuated in such a manner so a to cause a forward motion of the pump 56, thereby filling the space 48 between the glass panes 44, 46 of the vehicle glass 14–18 with the desired tinted fluid 52.

Figure 7:
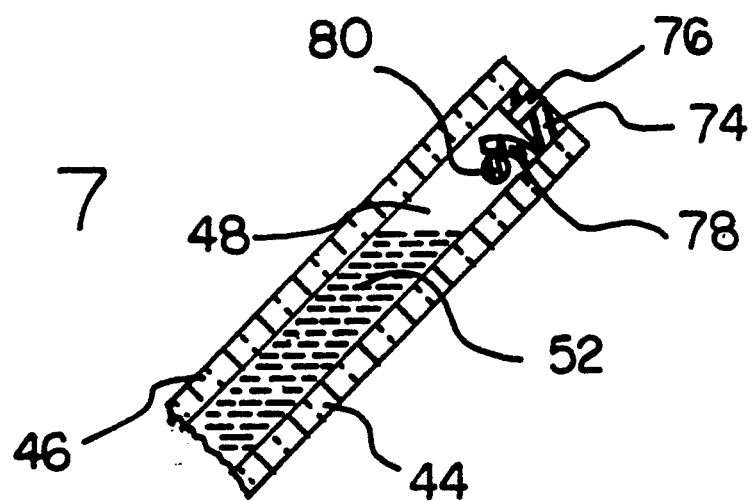
FIG. 7 is a cross sectional view taken along line 7—7 of FIG. 5.

FIG. 7 illustrates a top area of the windshield 14 which substantially represents a construction of the top areas of each piece of vehicle glass 14–18. The glass panes 44, 46 are connected by a separator 74 having a vent aperture 76 therethrough. A flexible sealing member 78 is disposed adjacent to the separator 74 and is provided with a float 80 secured thereto. The vent aperture 76 is operable to allow air to both enter and escape from the space 48 between the glass panes 44, 46 as it is being drained and filled, respectively. As the fluid 52 substantially fills the space 48, the float 80 is operable to bias the flexible sealing member 78 against the vent aperture 76 thereby disabling fluid communication through the vent aperture.

Figure 8:
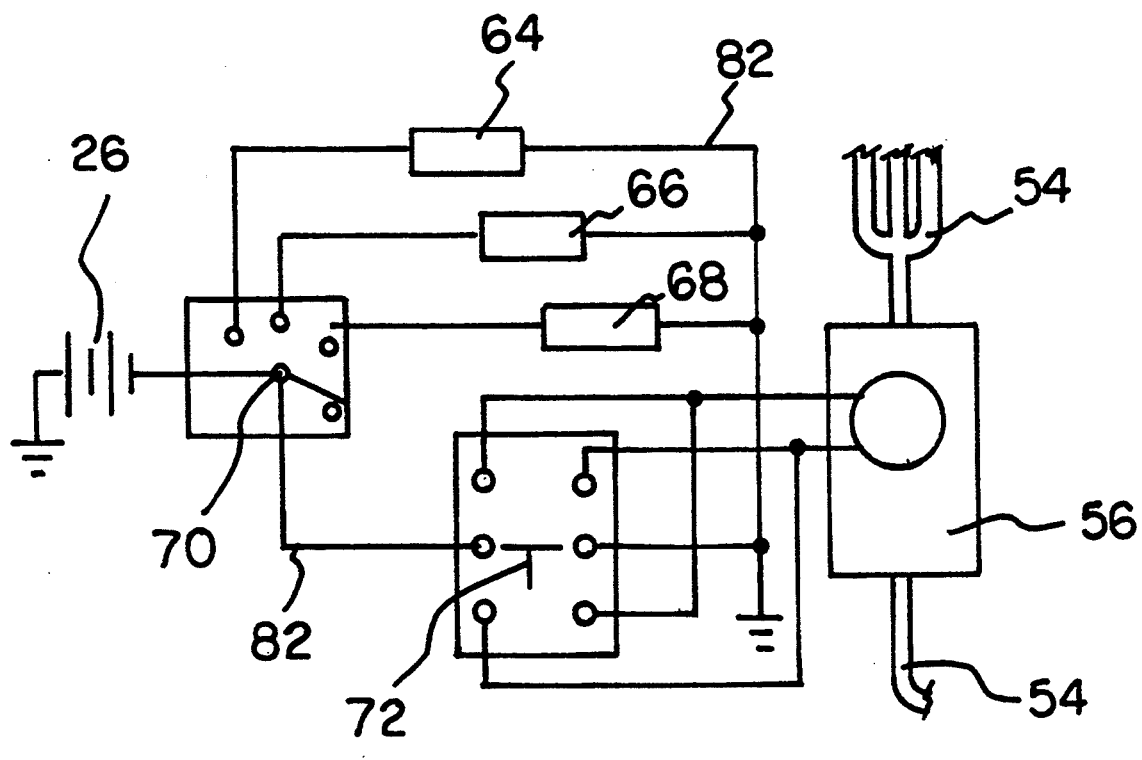
FIG. 8 is an electrical circuit schematic of a portion of the third embodiment.

FIG. 8 diagrams the electrical interaction between components of the third embodiment 42 and illustrates a plurality of wires 82 which provide electrical communication therebetween. It is believed that the given diagram is more than adequate to allow one who is skilled in the art to construct and use the present invention as disclosed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable window tinting system comprising:
   a tinted fluid;
   a pair of glass panes positioned in a spaced, parallel relationship so as to define a space therebetween;
   sealing means coupled to both of said glass panes for permitting said fluid to reside within said space between said glass panes, said sealing means including a vent positioned along an uppermost portion thereof for permitting air to enter and exit said space;
   a flexible sealing member mounted to said sealing means proximal to said vent, said flexible sealing member being positionable over said vent to close said vent;
   a float member attached to said flexible sealing member, said float being buoyant relative to said fluid so as to position said flexible sealing member over said vent when said space is filled with said fluid;
   a container for receiving said fluid, said container being in fluid communication with said space; and,
   a pumping means for selectively transferring said fluid from said container to said space.

2. An adjustable window tinting system comprising:
   a first tinted fluid;
   a second tinted fluid;
   a pair of glass panes positioned in a spaced, parallel relationship so as to define a space therebetween;
   sealing means coupled to both of said glass panes for permitting one of said fluids to reside within said space between said glass panes, said sealing means including a vent positioned along an uppermost portion thereof for permitting air to enter and exit said space;
   a flexible sealing member mounted to said sealing means proximal to said vent, said flexible sealing member being positionable over said vent to close said vent;

a float member attached to sail flexible sealing member, said float being buoyant relative to said fluids so as to position said flexible sealing member over said vent when said space is filled with one of said fluids;

a first container for receiving said first fluid;

a second container for receiving said second fluid;

valve means in fluid communication with said space and both said first and second containers for selectively permitting fluid communication between an individual one of said first and second containers and said space; and, a pumping means for selectively transferring said fluid from one of said first and second containers to said space.

3. An adjustable window tinting system comprising:

a first tinted fluid;

a second tinted fluid;

a pair of glass panes positioned in a spaced, parallel relationship so as to define a space therebetween;

sealing means coupled to both of said glass panes for permitting one of said fluids to reside within said space between said glass panes, said sealing means including a vent positioned along an uppermost portion thereof for permitting air to enter and exit said space;

a flexible sealing member mounted to said sealing means proximal to said vent, said flexible sealing member being positionable over said vent to close said vent;

a float member attached to said flexible sealing member, said float being buoyant relative to sand fluids so as to position said flexible sealing member over said vent when said space is filled with one of said fluids;

a first container for receiving said first fluid;

a second container for receiving said second fluid;

a first electric valve in fluid communication with said first container and said space for selectively permitting fluid communication between said first container and said space;

a second electric valve in fluid communication with said second container and said space for selectively permitting fluid communication between said second container and said space;

a selector in electrical communication with said first and second electric valves for selectively actuating an individual one of said valves; and, a pumping means in fluid communication with said valves for selectively transferring said fluid between said space and an individual one of said first and second containers.

4. The adjustable window tinting system of claim 3, wherein said first fluid is of a first color, and said second fluid is of a second color, wherein said first and second colors are contrasting colors.

5. The adjustable window tinting system of claim 3, wherein said first fluid is of a first darkness, and said second fluid is of a second darkness, wherein said first fluid permits a greater amount of light to pass therethrough than said second fluid.

* * * * *